Feb. 12, 1929.  
P. F. SCHRYER  
1,701,732

MOTOR ATTACHMENT BELT TIGHTENER

Filed April 14, 1927

Inventor  
Paul F. Schryer  
By H. J. Doolittle  
Atty.

Patented Feb. 12, 1929.

1,701,732

UNITED STATES PATENT OFFICE.

PAUL F. SCHRYER, OF MILWAUKEE, WISCONSIN, ASSIGNOR TO INTERNATIONAL HARVESTER COMPANY, A CORPORATION OF NEW JERSEY.

MOTOR ATTACHMENT BELT TIGHTENER.

Application filed April 14, 1927. Serial No. 183,718.

This invention has to do generally with motor drive attachments, and particularly with a belt tightener mechanism for such attachments belted to power drive a cream separator, or the like.

The objects of the invention are generally to improve the construction and operation of such belt tighteners; to provide such a belt tightener which is a part of the motor, so that the axis of movement of the tightener will always be maintained in parallelism with the axis of the motor shaft; and, lastly, generally to improve and simplify devices of this kind.

Briefly, these desirable objects are accomplished in combination with a cream separator, or the like, having a driven element, and a supporting plate, of a motor adjustably mounted on said supporting plate, and belted to drive said cream separator driven element, there being a belt tightener for the belt, which tightener is automatic in operation and is carried on a pivot pin, the axis of which is in parallelism with the axis of the motor shaft, in all positions of adjustment of the motor on the supporting plate. In other words, the belt tightener is formed as a part of the motor, so that when the motor is moved, the tightener is moved with it, thereby assuring that the motor will always be properly lined up with the driven element on the cream separator.

Looking now to the accompanying sheet of drawings, wherein an illustrative form of the invention has been shown, it will be seen that—

Figure 1:
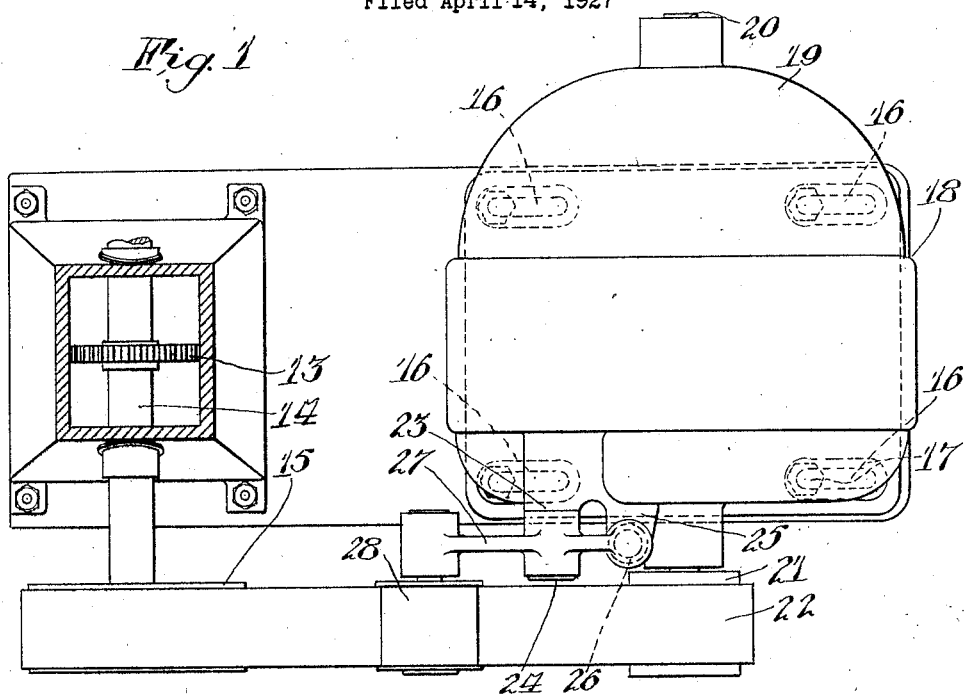
Figure 2:
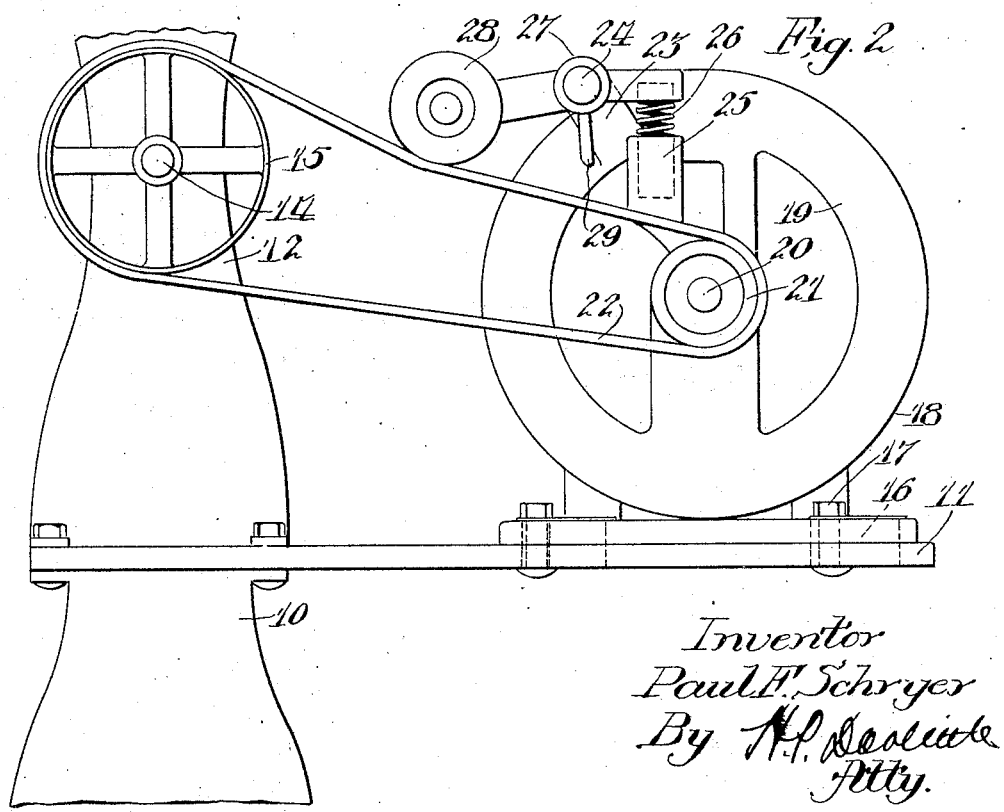

Figure 1 is a plan view showing the cream separator, motor, and improved belt tightener associated therewith; and Figure 2 is a side elevational view of the same structure shown in Figure 1.

The cream separator is fragmentarily shown, it being of standard construction and embodying a base or stand 10, a supporting plate 11, body 12, gearing 13, carried on a shaft 14 journaled in the body 12 and carrying at its projected free end, a pulley wheel 15.

The supporting plate 11 is in the nature of a shelf, which adjacent its outer end is provided with four elongated slots 16, there being two such slots in alinement along each marginal edge of the plate, as shown best in Figure 1. Made fast in these slots by four bolts 17, one for each slot, is a motor housing 18 enclosing a motor 19 having a transversely arranged shaft 20 carrying at one end a small pulley wheel 21. A driving belt 22 connects the small pulley wheel 21 of the motor with the relatively larger pulley wheel 15 of the cream separator, whereby the motor drives the driven elements of the cream separator.

In a driving arrangement of this kind, means must be provided for yieldingly maintaining the belt 22 taut. This invention provides an improved means for this purpose, which will now be specifically described.

The motor housing has formed therewith adjacent its top side, an integral laterally extending socket 23 in which is rockably journaled a pin 24, the axis of which is parallel with the axis of the motor shaft 20. A second integral socket 25 is formed on the housing, this socket being vertically arranged and slightly spaced from the first mentioned socket. This vertical socket 25 functions as a nest for a spring 26, as shown. The pin 24 carries a rocker arm 27 intermediately of its ends, one end of said arm carrying a roller 28 contacting the belt 22, while the other end of the arm is cupped out at its under side to receive the spring 26, said spring exerting a force to rock the arm in a direction yieldingly to press the roller 28 into engagement with the belt 22 to take up slack therein, as will be understood. Integrally formed with the arm 27 is a depending stop 29, which stop extends radially of the pin 24, for a purpose later to be made clear.

The operation and use of the above structure will now be described.

It is desired to power drive the driven element 15 of the cream separator shown, said separator embodying the supporting plate 11 upon which is adjustably carried, by means of bolts 17 secured in elongated slots 16, a motor 19. The motor carries a driving element 21 lined up with the cream separator driven element 15 so that a belt 22 may connect said elements. On a pin 24 the motor carries in parallelism with the motor shaft 20, a spring pressed belt tightener 28, which, due to its mounting on the motor, will in all positions of adjustment of the motor 19 on the shaft 11 act properly to maintain the driving belt 22 tight. When the belt 22 is removed, the spring 26 would cause the roller 28 with its arm part to tip downwardly, and this movement, lest it be too extreme, is stopped when the finger 29 abuts the socket 25, as will be obvious.

From the above detailed disclosure, it must now be appreciated that a simple, yet effective, belt tightener has been provided in a driving arrangement, as described, which achieves all of the desirable objects heretofore recited. Mounting of the tightener on the motor in the manner described assures that at all times and in all positions of the motor on the shelf, the tightener will act most effectively on the belt.

It is to be understood that various changes in the illustrative form of the invention herein shown may be resorted to by those skilled in this art, and that it is the intention to cover all such changes and modifications which do not materially depart from the spirit and scope of this invention, as is indicated in the appended claims.

What is claimed is:

1. The combination with a cream separator having a driven element and a shelf, a motor having a shaft and driving element, a belt connecting said driven and driving elements, said motor being adjustably mounted on said shelf, of a belt tightener for the belt comprising a rocker arm carried intermediately of its ends on a pin arranged in a socket formed on the motor and parallel with the motor shaft, a roller on one end of said arm engageable with the belt, a second socket on the motor, means therein acting to rock the rocker arm and roller toward the belt, and means limiting the movement of said rocker arm.

2. In combination, an electric motor having a housing, a horizontal socket on the housing, a pin in the socket, a rocker arm carried intermediate its ends on said pin, an idler roller carried at one end of said arm, a vertical socket on the housing, and resilient means in said vertical socket acting on the other end of said rocker arm.

3. In combination, an electric motor having a housing, an integral horizontally arranged socket formed with the housing, a pin in said socket, a rocker arm carried intermediate its ends on said pin, an idler roller on one end of said arm, an integral vertically arranged socket formed with said housing, resilient means in said vertical socket acting on the other end of said rocker arm, and a stop member formed with the rocker arm, said stop member being engageable with the vertical socket to limit movement of the rocker arm.

4. A belt tightener for an electric motor, said tightener comprising a substantially horizontally disposed rocker arm pivoted intermediately of its ends on a transverse pin carried on the motor, a vertically arranged spring seated in a vertical socket on the motor, said spring acting to push one end of the rocker arm upwardly, a roller carried on the opposite end of the arm, and a depending stop extending downwardly and radially from the transverse pin, said stop adapted to abut the vertical socket on the motor for limiting downward movement of that end of the rocker arm carrying the roller.

In testimony whereof I affix my signature.

PAUL F. SCHRYER.